US011289070B2

(12) United States Patent
Rankin

(10) Patent No.: US 11,289,070 B2
(45) Date of Patent: Mar. 29, 2022

(54) SYSTEM AND METHOD FOR IDENTIFYING A SPEAKER'S COMMUNITY OF ORIGIN FROM A SOUND SAMPLE

(71) Applicant: John Rankin, Morgantown, WV (US)

(72) Inventor: John Rankin, Morgantown, WV (US)

(73) Assignee: Rankin Labs, LLC, Williamsport, OH (US)

( * ) Notice: Subject to any disclaimer, the term of this patent is extended or adjusted under 35 U.S.C. 154(b) by 261 days.

(21) Appl. No.: 16/362,215

(22) Filed: Mar. 22, 2019

(65) Prior Publication Data
US 2019/0295528 A1    Sep. 26, 2019

Related U.S. Application Data

(60) Provisional application No. 62/647,125, filed on Mar. 23, 2018.

(51) Int. Cl.
*G06F 40/268*    (2020.01)
*G10L 15/00*    (2013.01)
*G10L 15/02*    (2006.01)
*G10L 15/22*    (2006.01)
*G10L 15/26*    (2006.01)
*G10L 15/30*    (2013.01)

(52) U.S. Cl.
CPC .......... *G10L 15/005* (2013.01); *G06F 40/268* (2020.01); *G10L 15/02* (2013.01); *G10L 15/22* (2013.01); *G10L 15/26* (2013.01); *G10L 15/30* (2013.01); *G10L 2015/025* (2013.01)

(58) Field of Classification Search
CPC ..... G10L 15/0005; G10L 15/02; G10L 15/22; G10L 15/26; G10L 15/30; G10L 2015/025; G06F 40/268
See application file for complete search history.

(56) References Cited

U.S. PATENT DOCUMENTS

| 3,688,090 A | 8/1972 | Rankin |
| 5,040,218 A * | 8/1991 | Vitale .................... G10L 13/08 704/260 |
| 6,023,724 A | 2/2000 | Bhatia et al. |
| 6,140,568 A | 10/2000 | Kohler |
| 6,532,445 B1 | 3/2003 | Toguri et al. |

(Continued)

FOREIGN PATENT DOCUMENTS

GB    2487795 A    8/2012

OTHER PUBLICATIONS

Berkling, Kay, et al. "Improving accent identification through knowledge of English syllable structure." Fifth International Conference on Spoken Language Processing. 1998. (Year: 1998).*

(Continued)

*Primary Examiner* — Daniel C Washburn
*Assistant Examiner* — Oluwadamilola M Ogunbiyi
(74) *Attorney, Agent, or Firm* — Standley Law Group LLP

(57) ABSTRACT

A system and method for determining a target speaker's community of origin from a sound sample of the target speaker is provided. An indexed database of morpheme data from speakers from various communities of origin is provided. Indexed morphemes from a target speaker are extracted. The extracted indexed morphemes from the target speaker are compared against the morpheme data in the indexed database to determine the target speaker's community of origin.

20 Claims, 6 Drawing Sheets

(56) References Cited

U.S. PATENT DOCUMENTS

| | | | |
|---|---|---|---|
| 6,567,416 B1 | 5/2003 | Chuah | |
| 6,584,442 B1 | 6/2003 | Suzuki et al. | |
| 6,714,985 B1 | 3/2004 | Malagrino et al. | |
| 6,751,592 B1* | 6/2004 | Shiga | G10L 13/07 704/258 |
| 6,757,248 B1 | 6/2004 | Li et al. | |
| 7,103,025 B1 | 9/2006 | Choksi | |
| 7,310,604 B1 | 12/2007 | Cascone et al. | |
| 8,374,091 B2 | 2/2013 | Chiang | |
| 8,397,151 B2 | 3/2013 | Salgado et al. | |
| 9,350,663 B2 | 5/2016 | Rankin | |
| 9,691,410 B2 | 6/2017 | Yamamoto et al. | |
| 2001/0017844 A1 | 8/2001 | Mangin | |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2003/0031198 A1 | 2/2003 | Currivan et al. | |
| 2004/0128140 A1 | 7/2004 | Deisher | |
| 2005/0105712 A1 | 5/2005 | Williams et al. | |
| 2005/0131692 A1 | 6/2005 | Charles | |
| 2005/0154580 A1 | 7/2005 | Horowitz et al. | |
| 2005/0286517 A1 | 12/2005 | Babbar et al. | |
| 2006/0002681 A1 | 1/2006 | Spilo et al. | |
| 2006/0034317 A1 | 2/2006 | Hong et al. | |
| 2006/0133364 A1 | 6/2006 | Venkatsubra | |
| 2006/0251264 A1 | 11/2006 | Higashihara et al. | |
| 2007/0094008 A1 | 4/2007 | Huang et al. | |
| 2007/0223395 A1 | 9/2007 | Lee et al. | |
| 2007/0282594 A1* | 12/2007 | Spina | G06F 40/58 704/9 |
| 2008/0162115 A1* | 7/2008 | Fuji | G06F 40/45 704/7 |
| 2008/0177543 A1* | 7/2008 | Nagano | G10L 15/04 704/253 |
| 2010/0103830 A1 | 4/2010 | Salgado et al. | |
| 2011/0149891 A1 | 6/2011 | Ramakrishna | |
| 2011/0191372 A1* | 8/2011 | Kaushansky | G06F 16/9535 707/776 |
| 2012/0289250 A1 | 11/2012 | Fix et al. | |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |
| 2013/0189652 A1 | 7/2013 | Marttila | |
| 2014/0012584 A1* | 1/2014 | Mitsui | G10L 13/10 704/261 |
| 2014/0073930 A1 | 3/2014 | Sethi et al. | |
| 2014/0100014 A1 | 4/2014 | Bennett, III et al. | |
| 2014/0254598 A1 | 9/2014 | Jha et al. | |
| 2014/0294019 A1 | 10/2014 | Quan et al. | |
| 2015/0100613 A1 | 4/2015 | Osiecki et al. | |
| 2015/0160333 A1 | 6/2015 | Kim et al. | |
| 2015/0161096 A1* | 6/2015 | Kim | G06F 40/253 704/9 |
| 2015/0161144 A1* | 6/2015 | Goto | G06F 40/45 707/739 |
| 2015/0229714 A1 | 8/2015 | Venkatsubra et al. | |
| 2015/0331665 A1* | 11/2015 | Ishii | H04N 21/4826 715/728 |
| 2015/0379834 A1 | 12/2015 | Datta et al. | |
| 2016/0269294 A1 | 9/2016 | Rankin | |
| 2017/0090872 A1 | 3/2017 | Mathew et al. | |
| 2017/0162186 A1* | 6/2017 | Tamura | G10L 13/08 |
| 2017/0277679 A1* | 9/2017 | Miyabe | G06F 40/253 |
| 2017/0345412 A1* | 11/2017 | Mitsui | G10L 13/07 |
| 2018/0012511 A1* | 1/2018 | Reed | G09B 21/009 |
| 2018/0018147 A1 | 1/2018 | Sugawara | |
| 2018/0024990 A1* | 1/2018 | Okura | G06F 16/93 704/9 |
| 2018/0075351 A1* | 3/2018 | Iwakura | G06K 9/6268 |
| 2018/0102975 A1 | 4/2018 | Rankin | |
| 2018/0279010 A1 | 9/2018 | Watanabe et al. | |
| 2018/0288211 A1* | 10/2018 | Kim | H04L 51/16 |
| 2019/0035431 A1 | 1/2019 | Attorre et al. | |
| 2019/0259073 A1* | 8/2019 | Enokizono | G06F 40/20 |
| 2020/0065369 A1* | 2/2020 | Cha | G06F 40/20 |

OTHER PUBLICATIONS

C. Veaux, J. Yamagishi and S. King, "The voice bank corpus: Design, collection and data analysis of a large regional accent speech database," 2013 International Conference Oriental COCOSDA, pp. 1-4, doi: 10.1109/ICSDA.2013.6709856. (Year: 2013).*

Darwish, Kareem, Hassan Sajjad, and Hamdy Mubarak. "Verifiably effective arabic dialect identification." Proceedings of the 2014 Conference on Empirical Methods in Natural Language Processing (EMNLP). (Year: 2014).*

Sharma, Mridusmita, and Kandarpa Kumar Sarma. "Learning aided mood and dialect recognition using telephonic speech." 2016 International Conference on Accessibility to Digital World (ICADW). IEEE. (Year: 2016).*

Zribi, Inès, et al. "Morphological disambiguation of Tunisian dialect." Journal of king Saud University—computer and information sciences 29.2 (2017): 147-155. (Year: 2017).*

Hamada, Salwa, and Reham M. Marzouk. "Developing a transfer-based system for arabic dialects translation." Intelligent Natural Language Processing: Trends and Applications. Springer, Cham, 2018. 121-138. (Year: 2018).*

Information Sciences Institute, University of Southern California, RFC 791, Internet Protocol, DARPA Internet Program Protocol Specification, Sep. 1981.

Postel, J., RFC 792, Internet Conlrol Message Protocol, DARPA Internet Program Protocol Specification, Sep. 1981.

Information Sciences Institute, University of Southern California, RFC 793, Transmission Conlrol Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Batchelder, E., Bootstrapping the Lexicon: A Computational Model of Infant Speech Segmentation, Cognition 83, 2002, pp. 167-206.

Cerisara, C., Automatic Discovery of Topics and Acoustic Morphemes from Speech, Computer Speech and Language, 2009, pp. 220-239.

Cole, P., Words and Morphemes as Units for Lexical Access, Journal of Memory and Language, 37, 1997, pp. 312-330.

Feist, J., Sound Symbolism in English, Journal of Pragmatics, 45, 2013, pp. 104-118.

Gerken, L. et al., Function Morphemes in Young Children's Speech Perception and Production, Developmental Psychology, 1990, vol. 26, No. 2, pp. 204-216.

* cited by examiner

SYSTEM AND METHOD FOR IDENTIFYING A SPEAKER'S COMMUNITY OF ORIGIN FROM A SOUND SAMPLE

CROSS-REFERENCE TO RELATED APPLICATIONS

This application claims the benefit of U.S. Provisional Application 62/647,125 filed Mar. 23, 2018, the disclosures of which are hereby incorporated by reference as if fully restated herein.

TECHNICAL FIELD

Exemplary embodiments of the present invention relate generally to a system and method for identifying a speaker's community of origin from a sound sample.

BACKGROUND AND BRIEF SUMMARY OF THE INVENTION

A morpheme is the smallest unit of sound that provides a distinguishable difference in a language. The morphemes of native language not only form the sound patterns that we experience within the culture of the speaker but also control the development of thought patterns. When first exposed to the morphemes of their natural environment, children begin to produce a perceptual concept of the environment that is as important to cognitive development as it is to the development of language skills.

Words in spoken language do not connect to our conscious mind as the symbols that we have come to know. It is difficult to determine how we as human beings connect to these symbols of sound and what they mean to who we are. One commenter notes "that sound symbolism in English has not been well understood by its detractors or by its proponents" ("*Sound Symbolism" in English*, Journal of Pragmatics, Feist, 2013, pg. 116). Exploring what begins with the infant and develops into the thinking adult, imagine an infant first presented with the stimulus of the smell of baking bread. This infant has no perceptual understanding of what the smell means. However, as the infant is habituated with the presentment that bread smell equals delicious food, a stimulus response develops that is effectively perceptual learning. The infant begins to develop an understanding, or perception, of the world around them as they are presented with more and more stimuli that can be associated with each experience. These are effectively the development of cognitive patterns within the brain. Prior to the infant's understanding of the stimulus, such smells were merely an associated sensory input. However, as the stimuli continue to be associated with experiences, each stimulus becomes attached to an understanding and a complete perception; a pattern emerges.

The hippocampus, within the temporal lobe, allows for the storing of information within the episodic and semantic memories. It is these specific types of memories or patterns that form the spatial working memory necessary to remember object orientation within the context of our perceptions. Without the hippocampus, the ability to remember different angles and approaches to objects would not be possible. As these patterns begin to form an understanding of our environment and our personality, they become, for lack of a better expression, our consciousness.

Infant Lexicon Development

A child is presented with a series of noises that represent the sound of the language in use around them. Perhaps the child hears something like "the man in the moon." For the child, the phrase is a disconnected series of noises, but for the adult it is a coherent sentence that conveys meaning. The infant begins a process of pattern matching in an attempt to determine what elements of the sound have been heard that might produce a response. The first response from the child might be to pass back the sound: "them anin them oon." This gibberish is effectively nonsense to the adult listeners and does not elicit a response that generates a coherent pattern for the infant. Eventually the child produces a word, or a phrase that produces a consistent and repeatable response, and thus a pattern begins to develop. Through this process, the infant can build a working lexicon of words and sounds that carry meaning and thus, produce a response.

The linguistic units upon which children build their understanding of language are sound segments that are generally referred to as "morphemes." As others have opined, "[c]hildren are sensitive to the existence of function morphemes. This may allow them to segment utterances into phrasal units from the outset, without using content words as the sole starting points. In addition, young children are sensitive to the segmental detail of factors and this may allow them to differentially label the syntactic categories of the phrases they isolate." (*Function morphemes in young children's speech perception and production*, Developmental Psychology, Gerken, Landau, & Remez, 1990, p. 214). Therefore, the morphemes that are the fundamental building blocks of the infant lexicon must hold the key for the understanding of the development that grows from this point, because the knowledge of sound meaning is not present from birth and must be constructed from the noise of the world around us.

Structure within the Mind

There is a difference between word and sound of distinct speakers, but is there an influence on a speaker's word choice, intellectual capacity, and language use because of the morphemes that helped develop their consciousness? There are "recognition models that assume that morphologically complex words are represented at some level of the processing system in a decomposed form" (*Words and morphemes as units for lexical access*, Journal of Memory and Language, Cole, Segui, & Taft, 1997, p. 3(2)). This is not outside the proposals of another commenter, Chomsky, where he proposes that a deep level structure of meaning is stored in some common format (*Topics in the theory of generative grammar*, The Hague: Mouton, Chomsky, 1978). However, for Chomsky, the deep structure is a universal understanding of concepts that can be known across social and geographic boundaries, while decomposed morphemes are specific to the culture and environment within which they have developed.

Given that there is a decomposed structure where morphemes develop our understanding of language, where is this located? It was Endel Tulving who first proposed a distinction between declarative and nondeclarative memory. "He defined semantic memory as knowledge about words and concepts, their properties, and interrelations" (*Cognitive Psychology: Mind and Brain*, Smith and Kosslyn, 2007, p. 195). Memory is divided into two main sections: declarative and procedural. Declarative memory is subdivided into two further sections: episodic and semantic. Episodic memory deals with specific details of an event, by associating it with what, when, and where. It is this type of memory that holds our fond images of childhood and mother's home cooking. Semantic memory differentiates from episodic, because it does not relate to a special location or time; it is concepts that are contained within semantic memory. Procedural memory is developed from perceptual-motor learning. This is the place that holds learned behavior; it is where we remember how to ride a bike or come to dinner when a bell is rung. "This type of memory does not depend upon the structural integrity of the temporal lobe system" (*Understanding leukemias lymphomas and myelomas*, Mughal, Goldman, & Mughal, 2009).

Long-term memories are memories that persist over an extensive period of time, remain accessible by other cognitive processes, and can reflect different categories of information. "Declarative memory is knowledge to which we have conscious access, such as motor and cognitive skills (procedural knowledge), perceptual priming, and simple learned behaviors that derive from conditioning, habituation, or sensitization" (*Cognitive Neuroscience: The Biology of the Mind*, Gazzaniga, Ivry, & Mangun, 2009, p. 321). Cognitive patterns that are related to morphemes must be stored within semantic memory, as this area of memory is specific to the developmental process and does not relate to events or places, nor does it align with learned behavior.

Acoustic morphemes from speech are stored within our semantic memory in a specific pattern, or network, that allows for connected access and retrieval. Christophe Cerisara's work in the area of morpheme and lexical study affirmatively demonstrated that not only is there a decomposed structure of morphemic data, but that that data is indeed structured into a hierarchy of topics that relate to meaning and knowledge (*Automatic discovery of topics and acoustic morphemes from speech*, Computer Speech and Language 23, Cerisara, 2009, pp 220-239). The ability of a speaker to produce and develop sentences is entirely related to their ability to construct complex thoughts out of the information that is stored within the semantic and episodic memory of the brain. By layering this information into memory patterns that comprise not only clocks of meaning but also meaning organized and retrievable by sound, this conceptual knowledge is the fundamental building material for all forms of higher thinking within a functioning adult. As layers of information are constructed to produce sentences, these sentences will invariably be affected by the retrieval process of how the information is stored in the network. "Some of the models propose that concepts are represented by their semantic features or semantic properties. For example, the word dog has several semantic features, such as 'is animate,' 'has four legs,' and 'barks,' and they are assumed to be represented in the conceptual network" (*Cognitive neuroscience, the biology of the mind*, Gazzaniga, Ivry, & Mangun, 2009, p. 392). Since this network is ultimately acoustic as well as semantic, it is clear that morphemes play and invaluable role in the development and construction of language.

What is needed is a system and method for identifying a speaker's community of origin from a sound sample. The present disclosures provide a system and method for identifying a speaker's community of origin from a sound sample. An indexed database of morpheme data from speakers of various communities of origin may be built. Morphemes may be extracted from a sound sample of a target speaker. The extracted morphemes of sound may be indexed. These indexed morphemes may be compared against the indexed database to identify the target speaker's community of origin.

By isolating and comparing morphology that is in common with the speaker and the community of origin, this system and method allows for highly reliable pinpointing of the community of origin from which the target speaker originated. In many cases, the community of origin may be specific to a given geographic location, and therefore the speaker's geographic location of origin may likewise be identified. Quick, accurate, and highly specific location information can be obtained from a segment of spoken language, regardless of the content, language, or intent of the speech.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
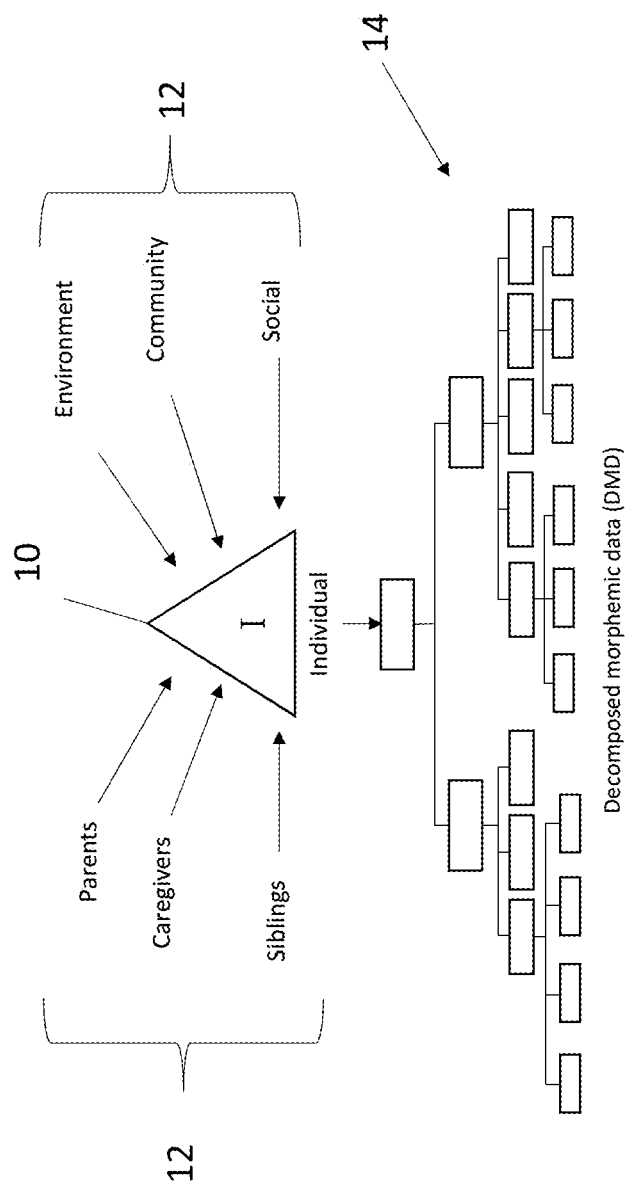
FIG. 1 is a simplified diagram representing the process of individual sound development.

FIG. 1 is a simplified diagram representing the process of infant sound development. Decomposed morphemic data ("DMD") 14 is held within long-term memory. This DMD 14 is developed in early childhood. Since DMD 14 is developed from sound fragments available to an individual 10, such as an infant, from their community of origin 12, this DMD 14, and the individual morphemes thereof, form the basic underlying structure of all developed language for the given individual 10. The morphemic lexicon is unique to each individual 10, and directly reflects sounds that were presented by caregivers, parents, siblings, and other surrounding individuals, immediate environment, community, and social aspects which collectively, and without limitation, make up the individual's 10 community of origin 12.

Research has affirmatively demonstrated that this lexicon of DMD 14 is built in infancy and augmented by the culture and environment of the community of origin 12. As language develops, all external sounds structures are composed of DMD 14 that has been originated from infancy for the individual 10 based upon the individual's 10 community of origin 12. By identifying morphemes present in the individual's 10 current speech, a direct connection may be made with morphemes developed in infancy due to the individual's 10 community of origin 12. It is not generally possible for the given individual 10 to control and eliminate morphemes from speech. Infant sound developed DMD 14 will always be present in the individual's 10 language.

Figure 2:
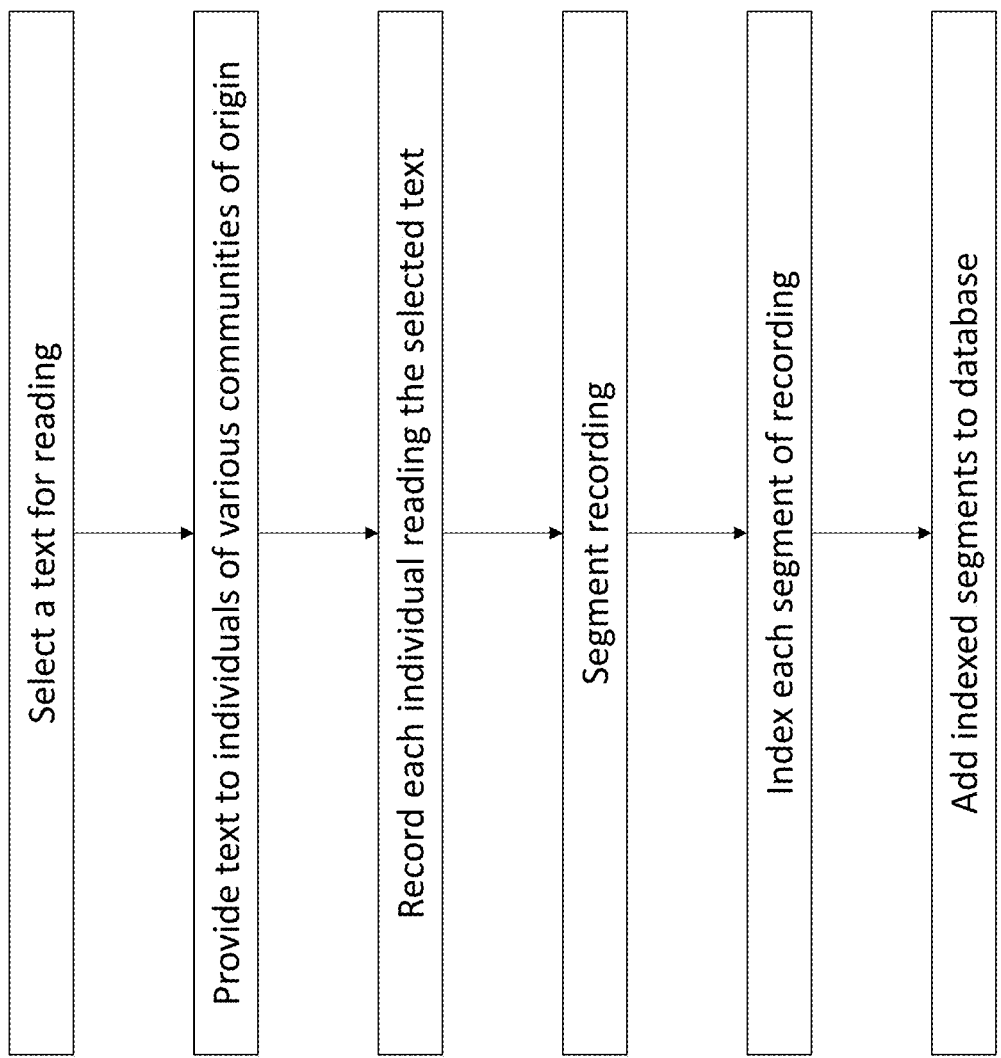
FIG. 2 is a simplified block diagram with exemplary logic for extracting morphemes from individuals of various communities of origin.

FIG. 2 illustrates exemplary logic for extracting morphemes from a sound sample 22 of a given speaker 10. A standard text may be selected. The text may comprise previously identified morpheme breaks in the word pattern. The selected text may be provided to one or more individuals 10 of a given community of origin 12. In exemplary embodiments, the selected text is provided to a random selection of individuals 10 in each community of origin 12. Each of the one or more individuals 10 may be recorded reading the selected text to produce a number of respective sound samples 22. Such recording may be made by way of one or more recording devices 21, such as but not limited to, a microphone, vibration sensor, laser, or the like. The recording device 21 may be electronically connected to an electronic storage device, such as but not limited to an indexed morpheme database 20, for storing a digital copy of the recording. Alternatively, or in addition, the recording device 21 may be electronically connected to a tape player, CD player, or the like for creating a physical copy of the recording. Each sound sample 22 may be segmented into morphemic pieces 24. In exemplary embodiments, each recorded sound sample is segmented along the previously determined breaks in the text such that each recording segment comprises a recorded sample of the individual 10 speaking a given morpheme. Each recording segment may be indexed and added to the database 20.

Figure 3:
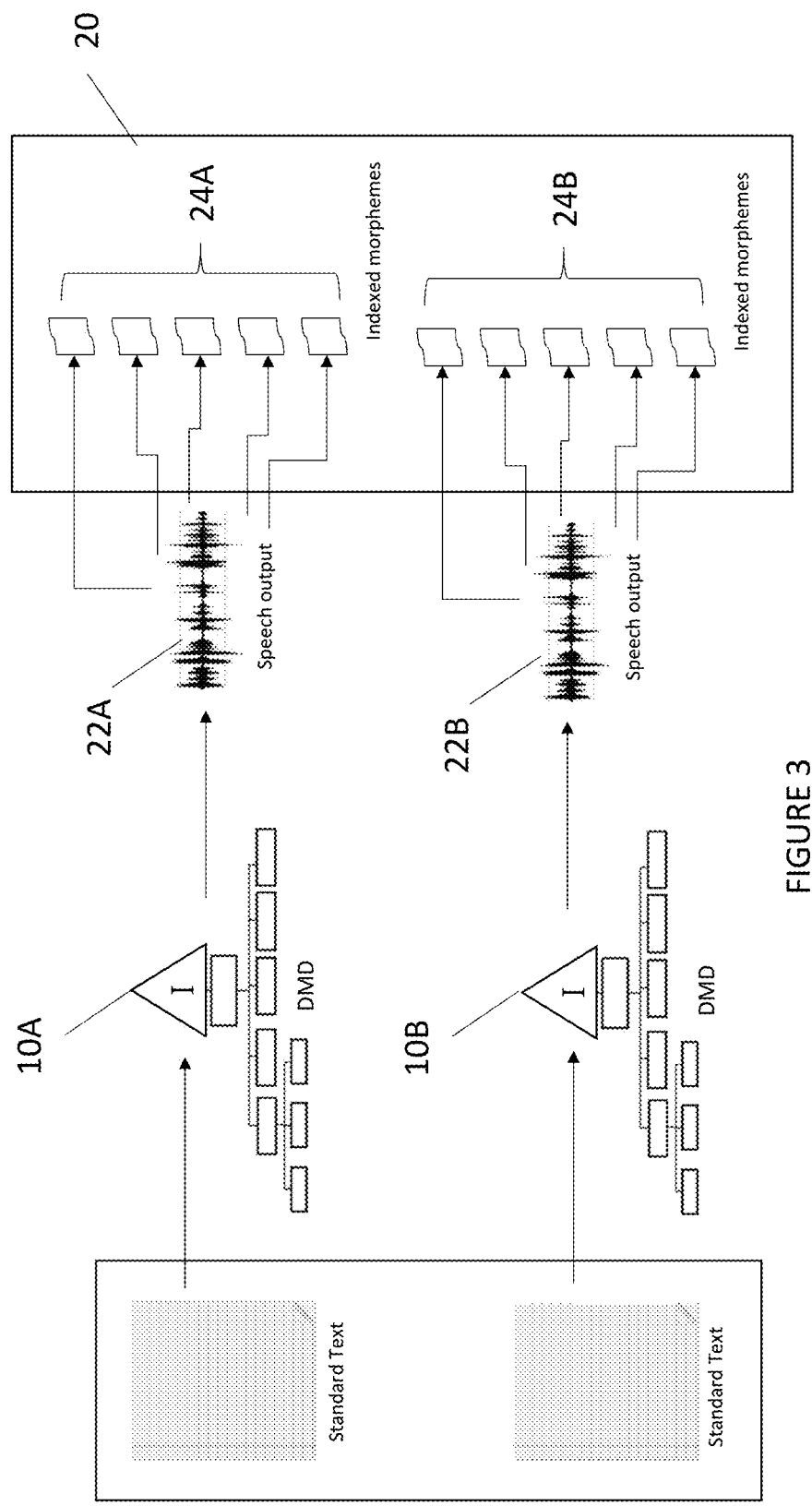
FIG. 3 is a simplified diagram illustrating the creation of an indexed morpheme database.

As further illustrated in FIG. 3, the process of FIG. 2 may be completed with respect to any number of individuals 10A and 10B from any number of communities of origin 12 to produce the indexed database of morphemic information 20. A sound sample 22A and 22B may be collected from each respective individual 10A and 10B. The database 20 may comprise indexed morphemes 24A and 24B for any number of speakers 10A and 10B from any number of communities of origin 12. The communities of origin 12 may each be associated with a given geographic location, in exemplary embodiments. As the database 20 is expanded, a wider range of individuals 10A and 10B may be connected with a wider range of communities of origin 12, and in exemplary embodiments without limitation, with a wider variety of corresponding geographic locations.

Figure 4:
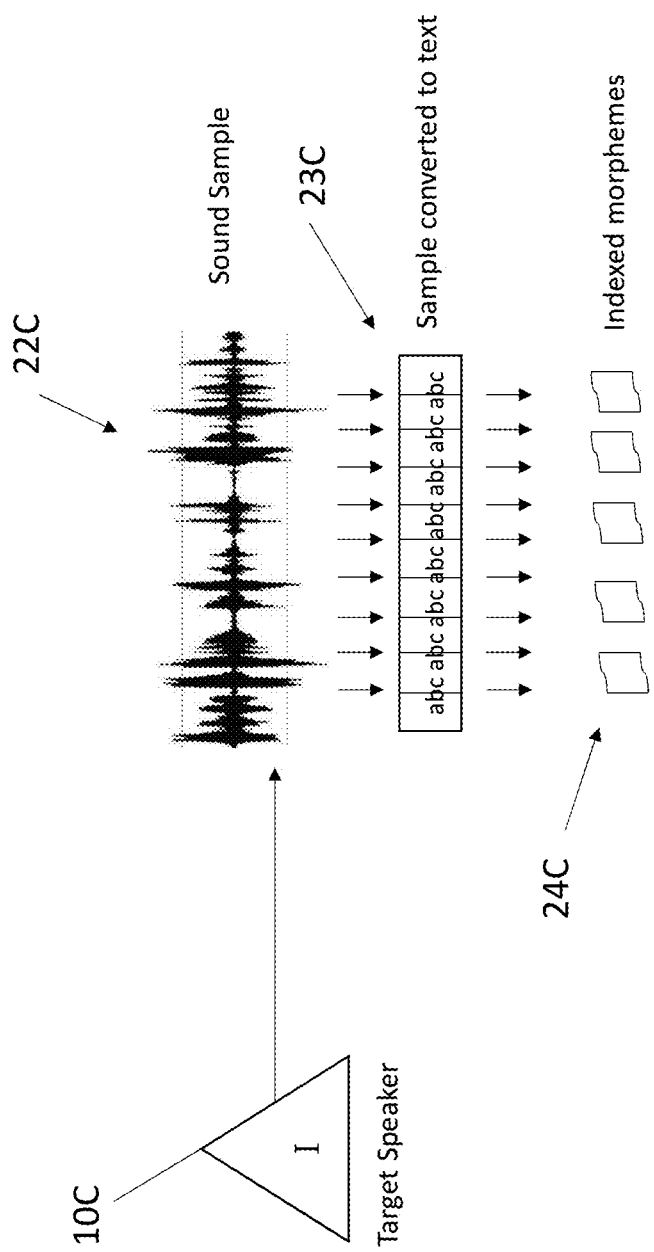
FIG. 4 is a simplified diagram illustrating the extraction of morphemes from a sound sample of a target speaker.

FIG. 4 illustrates an exemplary extraction of morphemes 24C from a sound sample 22C of a target speaker 10C. The sound sample 22C may be recorded from any speech sample of the target speaker 10C. Such recording may be made by way of one or more recording devices 21, such as but not limited to, a microphone, vibration sensor, laser, or the like. The recording device 21 may be electronically connected to an electronic storage device, such as but not the database 20, for storing a digital copy of the recording. Alternatively, or in addition, the recording device 21 may be electronically connected to a tape player, CD player, or the like for creating a physical copy of the recording.

The target speakers' 10C speech may be isolated from other ambient noise picked up in the recording. In exemplary embodiments, the sound sample 22C is from the same selected text as referenced in FIG. 2 though such is not required. In other exemplary embodiments, morphemes 24C from the sound sample 22C of the target speaker 10C may be extracted by converting the sound sample 22C into text 23C. The text 23C may be segmented along morphemic breaks to reflect individual morphemes 24C such that the sound sample 22C is divided into morphemic segments of sound. The associated sound sample 22C may be likewise segmented to reflect individual morphemes 24C. Each morpheme segment 24C may be indexed for subsequent comparison to produce morphemically indexed speech stored at the database 20. The resulting indexed morphemes 24C may be in the same format as the morphemic sound information stored within the database 20.

Figure 5:
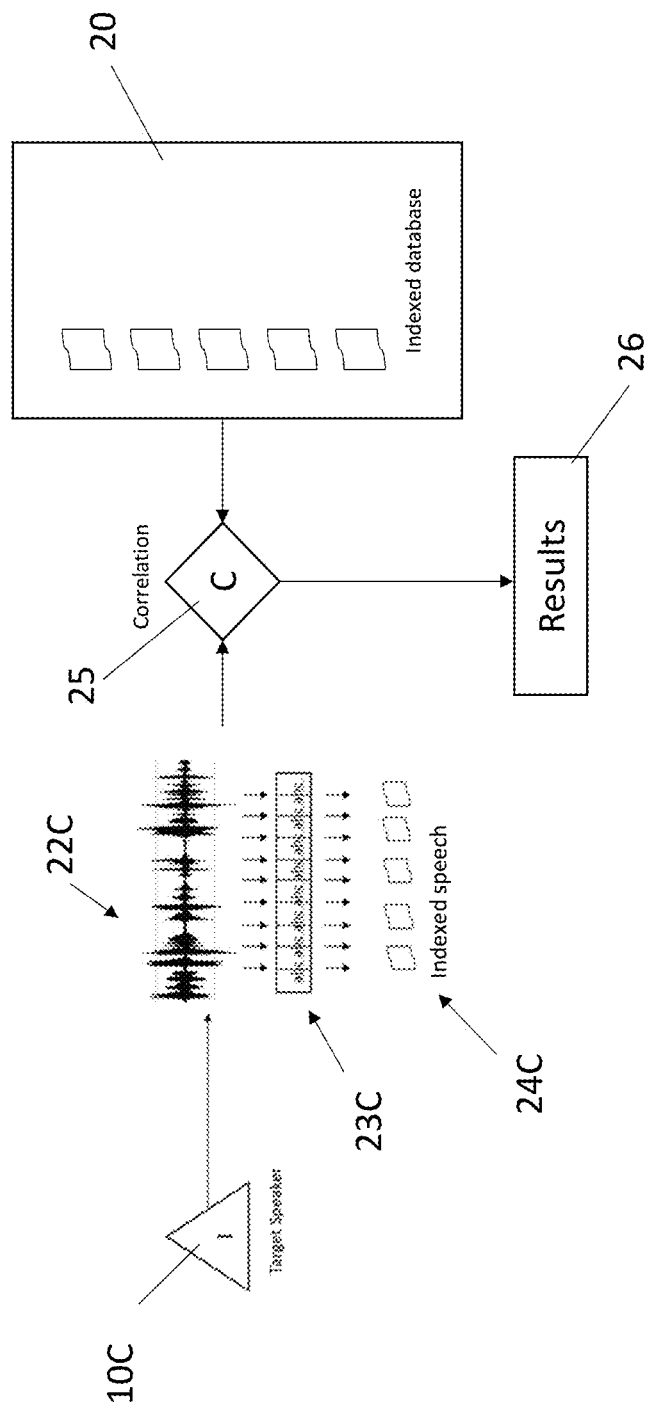
FIG. 5 is a simplified diagram illustrating the correlation between the target speaker's extracted morphemes and the morphemes stored in the indexed database.

FIG. 5 is a simplified diagram illustrating the correlation of the target speaker's 10C individual morphemes 24C with indexed data in the morpheme database 20 to determine the target speaker's 10C community of origin 12. Such correlation may be performed at one or more processors 22 which may be in electronic communication with the database 20 as well as one or more electronic storage device. Once the target speaker's 10C sound sample 22C has been broken into indexed morpheme segments 24C, each of the morpheme segments 24C may be compared against each of the collected morphemic database 20, as generally indicated at item 25, until a match is determined or no match is found. Such matching may be determined if a given target speaker's 10C morpheme segment 24C is within a predetermined margin of a stored morpheme segment 24A and 24B. By isolating sound that is unique to a given community of origin, the likelihood that the target speaker 10C originated in the same community of origin 12 may be identified.

If no match is found, such a finding may be presented as a result 26. However, if a match is found, the community of origin 12 information associated with the target speaker 10C may be presented as the result 26. Other information may also be presented, such as but not limited to, associated geographic location information for the matched community of origin 12 as well as data reflecting the confidence level of the result 26. The underlining DMD 14 within the target speaker's 10C speech cannot be eliminated from spoken language and will always be present and extractable. As long as the database 20 is sufficiently robust and specific, the identification will be revealed using a comparison and correlation between the samples.

Figure 6:
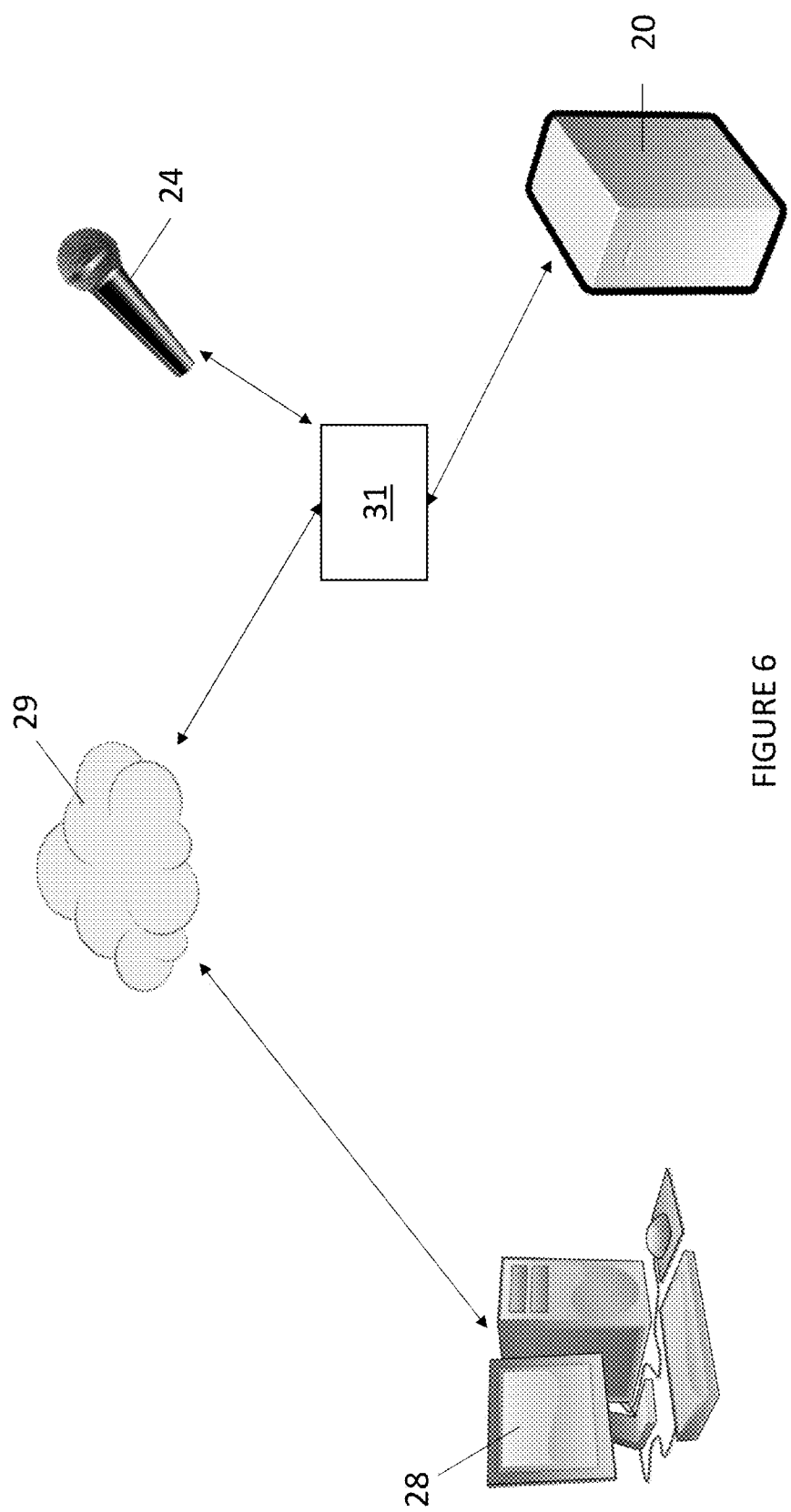
FIG. 6 illustrates an exemplary system for use with the systems and methods of FIGS. 1-5.

FIG. 6 illustrates an exemplary system for use with the systems and methods of FIGS. 1-5. Such result information 26 may be displayed at one or more electronic displays 28 in communication with the processor 31. Such electronic displays 28 may be local or remote. Such electronic displays 28 may be part of a personal computer, a smartphone, a tablet, a smartwatch, or the like. Such electronic communication may be made by way of a network 29 and one or more network communication devices. The network 29 may be an internet, the world wide web, an intranet, a cellular network, or the like.

Certain operations described herein may be performed by one or more electronic devices. Each electronic device may comprise one or more processors 31, electronic storage devices, executable software instructions, and the like configured to perform the operations described herein. The electronic devices may be general purpose of specialized computing device. The electronic devices may be personal computers, smartphone, tablets, databases, servers, or the like. The electronic connections described herein may be accomplished by wired or wireless means.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for determining a target speaker's community of origin from a sound sample of the target speaker, said method comprising the steps of:
providing a database of indexed morpheme data from speakers of various communities of origin;
extracting morphemes from a sound sample of a target speaker; and
comparing extracted morphemes from the sound sample of the target speaker against morpheme data in the database of indexed morpheme data to determine whether the extracted morphemes from the sound sample of the target speaker match any of the indexed morphemes stored in the database, thereby indicating that the community of origin of the target speaker is a particular one of the various communities of origin associated with the speaker of the matching indexed morphemes.

2. The method of claim 1 wherein:
the step of providing the database of indexed morpheme data comprises the sub-steps of:
presenting a text to one or more individuals from each of the various communities of origin;
recording each of said individuals reading the presented text;
segmenting each recording along morpheme breaks;
indexing the recording segments; and
adding said indexed segments to the database.

3. The method of claim 2 wherein:
the presented text is a standard text with known morpheme breaks.

4. The method of claim 3 wherein:
each recording is segmented along the known morpheme breaks of the standard text.

5. The method of claim 1 wherein:
the step of extracting morphemes from the sound sample of the target speaker comprises the sub-steps of:
recording the sound sample of the target speaker's speech;
segmenting the sound sample along morpheme breaks; and
indexing each morpheme segment.

6. The method of claim 5 wherein:
the recorded sound sample is taken from a reading of a standard text with known morpheme breaks; and the sound sample is segmented along the known morpheme breaks.

7. The method of claim 5 wherein:
the step of extracting morphemes from the sound sample of the target speaker comprises the additional sub-steps of:
converting the recorded sound sample to text; and
identifying morpheme breaks in the text.

8. The method of claim 7 wherein:
said morpheme breaks are determined by a morpheme lexicon.

9. The method of claim 7 wherein:
the step of extracting morphemes from the target speaker comprises the additional sub-step of isolating the target speaker's speech from ambient noise in the recorded sound sample.

10. The method of claim 1 further comprising the steps of:
associating each community of origin with a geographic location; and
presenting the target speaker's determined community of origin and related geographic location.

11. The method of claim 1 further comprising the steps of:
determining a confidence level of the target speaker's determined community of origin; and
presenting the confidence level with the target speaker's community of origin.

12. The method of claim 1 wherein:
the step of comparing extracted morphemes from the sound sample of the target speaker against the morpheme data in the database of indexed morpheme data to determine whether the extracted morphemes from the sound sample of the target speaker match any of the indexed morphemes stored in the database further comprises the sub-step of determining a match between a morpheme segment extracted from a sound sample of the target speaker and a morpheme segment from the database of indexed morpheme data within a predetermined margin.

13. The method of claim 12 wherein:
the speakers from each of the various communities of origin are randomly selected.

14. The method of claim 1 wherein:
the database of indexed morpheme data comprises morpheme data from a number of speakers in each of the various communities of origin.

15. A method for determining a target speaker's community of origin from a sound sample of the target speaker, said method comprising the steps of:
identifying a standard text with known morpheme breaks;
presenting said standard text to one or more individuals, each from one of a plurality of communities of origin;
recording each of said individuals reading the standard text;
segmenting each recording into morphemes along the known morpheme breaks;
indexing each recording segment;
adding each indexed segment to a database;
recording the sound sample of the target speaker;
dividing the sound sample into target speaker morpheme segments;
indexing each target speaker morpheme segment;
comparing the target speaker morpheme segment against the indexed recordings in the database to determine a match; and
retrieving a particular one of the plurality of communities of origin associated with the matched recording.

16. The method of claim 15 further comprising the steps of:
  associating each of the plurality of communities of origin with a geographic location; and
  retrieving the geographic location associated with the particular one of the plurality of communities of origin.

17. The method of claim 15 further comprising the steps of:
  converting the recorded sound sample of the target speaker into text; and
  identifying morpheme divisions in the converted text by a morpheme lexicon, wherein the sound sample is segmented along the identified morpheme divisions.

18. The method of claim 15 further comprising the steps of:
  isolating the target speaker's speech from ambient noises in the recorded sound sample.

19. The method of claim 15 wherein:
  the sound sample of the target speaker comprises a recording of the target speaker reading the standard text; and
  the sound sample of the target speaker is divided along the known morpheme breaks.

20. A system for determining a community of origin of a target speaker from a sound sample of the target speaker, said system comprising:
  a database comprising a plurality of indexed morpheme segments derived from segmented recordings of a number of individuals from a number of communities of origin reading a standardized text with known morpheme breaks, wherein each recording is segmented along said known morpheme breaks to generate said indexed morpheme segments;
  a recording device configured to record the sound sample of the target speaker; and
  a processor configured to execute software instructions stored at one or more non-transitory electronic storage devices, which when executed, configure the processor to divide the sound sample into target speaker morpheme segments, index each of the target speaker morpheme segments, compare each of the target speaker morpheme segments against each of the indexed morpheme segments in the database to determine a match, and retrieve the community of origin for one of the number of individuals associated with the matching one or ones of the indexed morpheme segments.

\* \* \* \* \*